July 22, 1952    H. C. DRAKE    2,603,966
SHIELD AND LIGHT CELL PICKUP FOR OSCILLOSCOPES
Filed Aug. 12, 1950    3 Sheets-Sheet 3

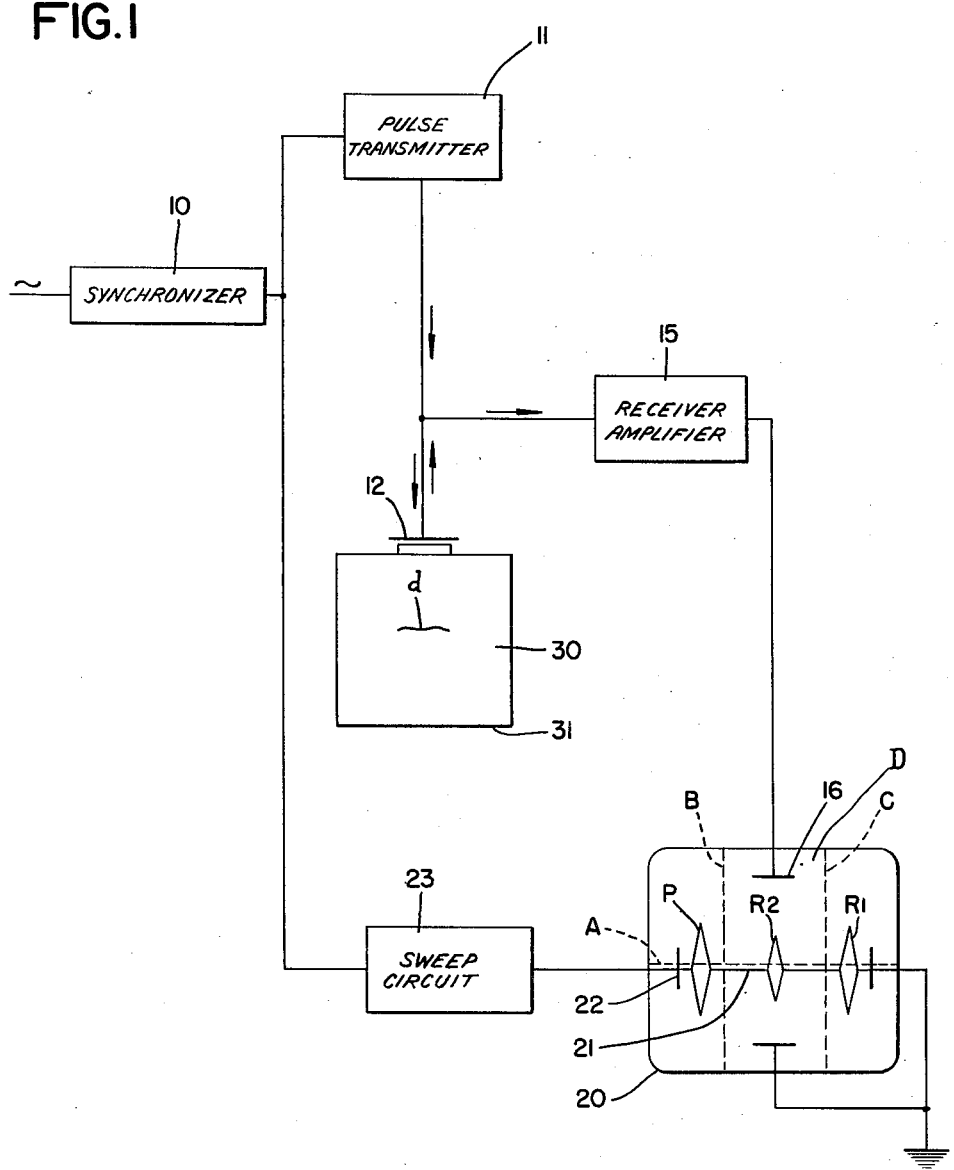

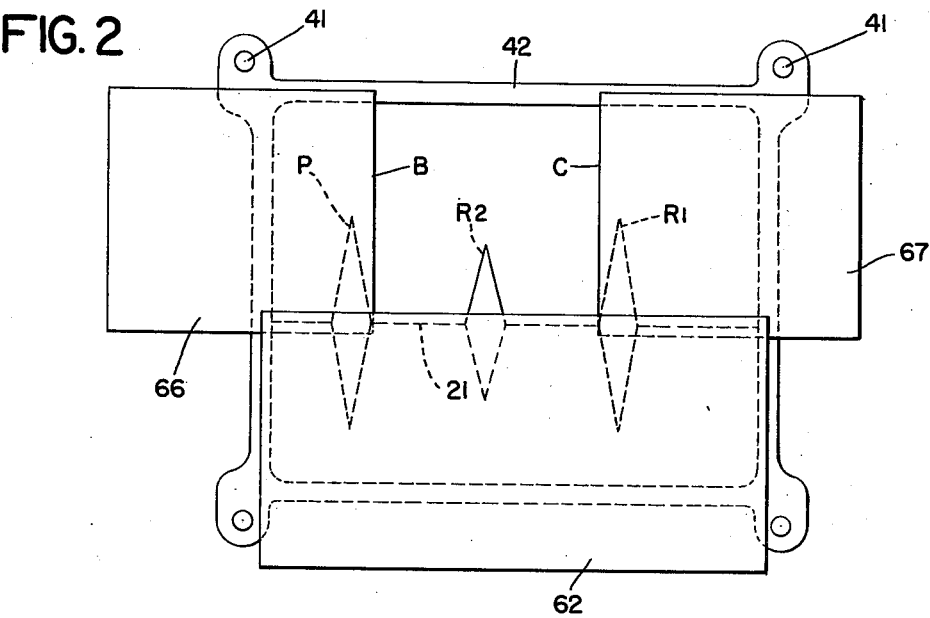
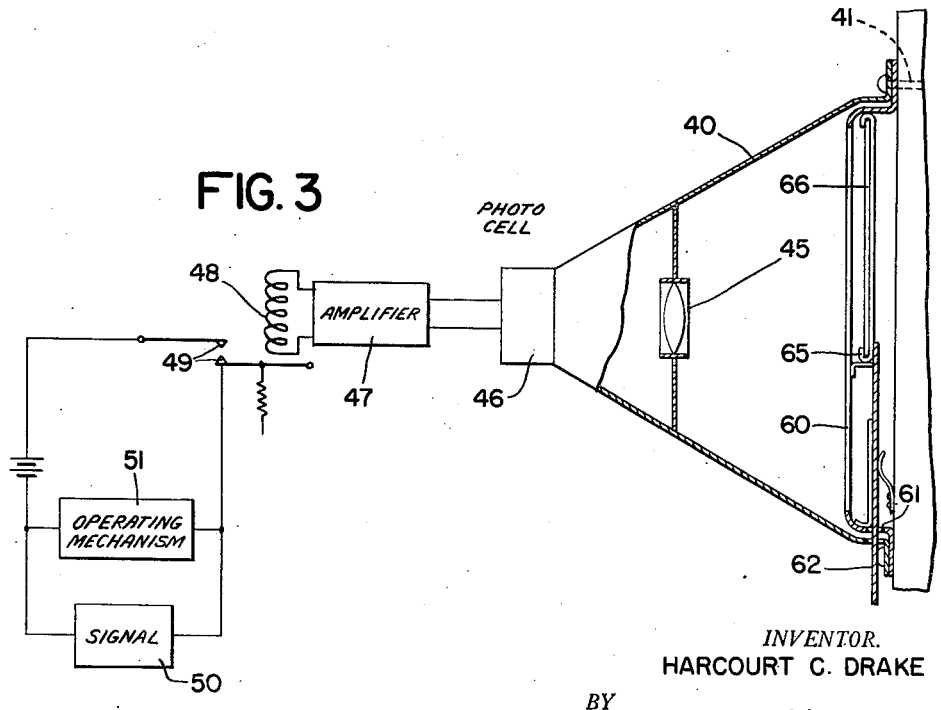

INVENTOR.
HARCOURT C. DRAKE
BY
Joseph H. Lipschitz
ATTORNEY.

Patented July 22, 1952

2,603,966

UNITED STATES PATENT OFFICE 2,603,966

SHIELD AND LIGHT CELL PICKUP FOR OSCILLOSCOPES

Harcourt C. Drake, Hempstead, N. Y., assignor to Sperry Products, Inc., Danbury, Conn., a corporation of New York Application August 12, 1950, Serial No. 179,048

1 Claim. (Cl. 73—67)

This invention relates to ultrasonic reflectoscopes in which ultrasonic pulses are periodically transmitted into an object for the purpose of inspecting same, and the time intervals between the transmission of the pulse and its reflection from reflecting surfaces bounding the object and inside the object are measured. The indication of such time intervals is usually obtained on an oscilloscope in which the transmitted pulse and the reflections appear as vertical deviations of a horizontal sweep.

It is the principal object of this invention to provide means which will automatically operate mechanism to give a signal apprising an operator of the presence of the defect, or which will operate reject or similar mechanism, or which will perform both of these functions, in each case automatically.

Further objects and advantages of this invention will become apparent in the following detailed description thereof.

In the accompanying drawings,

Fig. 1 is an electric block diagram showing an arrangement embodying one form of my invention.

Fig. 2 is an enlarged view of the face of an oscilloscope with certain of the mechanism constituting this invention applied thereto.

Fig. 3 is a vertical section through one embodiment of this invention in combination with an electric block diagram.

Figure 4:
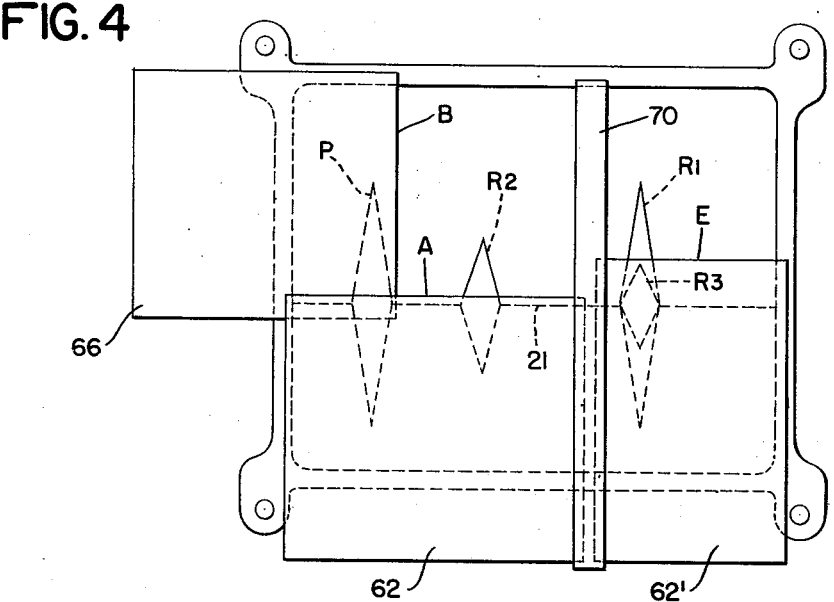
Fig. 4 is a view similar to Fig. 2 of a modified form of this invention.

Referring first to Fig. 1 I have shown a conventional form of ultrasonic inspection device in which a synchronizer 10 may be periodically energized from any suitable source such as 60 cycle AC which will energize the synchronizer sixty times per second, each energization of synchronizer 10 being effective to trip a pulse transmitter 11 to generate an ultrasonic pulse. The transmitted pulse is applied to an electroacoustic transducer 12 which may be a quartz crystal, and at the same time is applied to a receiver amplifier 15 whose output is applied to the vertical plates 16 of an oscilloscope 20 to cause vertical deviation of a sweep 21 between horizontal plates 22. The sweep is generated by a sweep circuit 23 energized by synchronizer 10 so that the sweep will be synchronized with the pulse transmission. The transmitted pulse will thus appear on the face of the oscilloscope as a vertical deviation P of the horizontal sweep. The transmitted pulse is transformed by crystal 12 into mechanical vibrations which travel into the object 30 which is to be inspected and which are reflected by any reflecting surfaces which the pulse encounters such as, for instance, the rear surface 31 of the object or a defect $d$ which may be a fissure. The reflected mechanical vibrations are received by crystal 12, are transformed into electrical vibrations to generate a voltage which is applied to the receiver amplifier 15 whose output is applied to vertical plates 16 of the oscilloscope. The reflection from rear surface 31 will appear as a vertical deviation R1 on the sweep, but if a defect $d$ is present there will be an intermediate deviation R2 since the reflection from surface $d$ will arrive sooner than the reflection from surface 31 and will be so indicated by its position along the sweep which represents an interval of time.

Heretofore it has been customary for an operator to watch the oscilloscope and if an intermediate reflection R2 appeared between the pulse indication P and the reflection of the rear surface R1, he knew that a defect was present within the object 30. This system however, required the services of an operator and did not lend itself to the rapid inspection of a large number of similar articles such as one encounters in mass production. To enable such objects to be inspected quickly it should be possible to actuate a signal automatically in response to the presence of the defect, or to operate automatic reject mechanism, or to do both of these things simultaneously.

To accomplish the foregoing results, I provide means whereby the oscilloscope will display no illuminated portion unless a defect is present. To this end I provide shielding means which will block out everything beginning at a horizontal line A (Fig. 1) just above the sweep and continuing down to the bottom of the face of the oscilloscope. Also I blot out all parts of the face of the oscilloscope to the left of a line B which is just to the right of the indication of pulse P and all parts of the oscilloscope to the right of a line C which is just to the left of the indication R1 corresponding to the rear surface 31 of object 30. Thus unless a defect is present to give an illuminated peak R2 there will be no illumination in the open unshielded area D of the oscilloscope.

The foregoing arrangement permits the rapid detection of the presence of defects and also permits the actuation of operating mechanism such as reject mechanism if desired. For this purpose there is provided a cone shaped enclosure 40 (Fig. 3) which is adapted to have its open end affixed to the post 41 in the frame 42 which surrounds the oscilloscope screen. Within the enclosure 40 there may be provided a concentrating lens system 45 designed to focus any light which appears in area D upon a photo cell 46 whose output, after being amplified by amplifier 47, is caused to operate a relay 48 which will close contacts 49 through a circuit which may include a suitable signal 50 which may be a beam of light, and through an operating mechanism 51 which may be a reject mechanism.

The shielding below line A, to the left of line B, and to the right of line C may be accomplished by adjustable shield members movable upwardly and downwardly for line A and inwardly and outwardly for lines B and C. For this purpose a frame 60 (Fig. 3) may be fastened to the same post 41 in the frame of the oscilloscope as the enclosure 40. The frame may have a vertical slot 61 in which slides a vertical shield 62 whose upper edge (see Fig. 2) forms the bounding line A. The frame 60 is also provided with a horizontal runway 65 in which slide horizontally a shield 66 whose inner edge forms the bounding line B, and a shield 67 whose inner edge forms the bounding line C.

Figure 5:
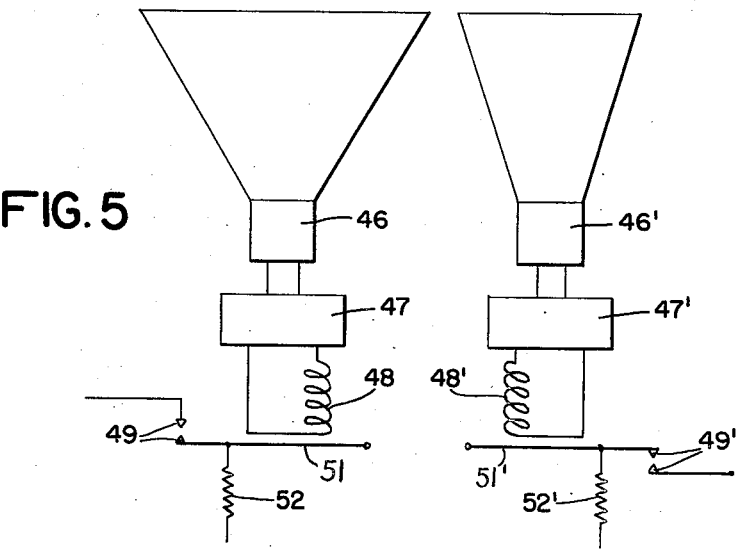
Fig. 5 is a view similar to Fig. 3 of mechanism employed in connection with the Fig. 4 form of the invention.

In inspecting objects for interior defects it has been stated that an intermediate reflection R2 appears. It sometimes happens however, that the effect of certain types of defects within the object acts in a different manner, i. e. instead of yielding a sharp reflection such as R2 it merely causes absorption of the pulse in its path from crystal 12 to rear face 31 and return, so that the presence of such defect is noted not by the appearance of an intermediate reflection R2 but by a sharp diminution of the size of reflection R1 due to scattering and absorption. To enable both types of defects to be detected automatically, I provide in place of the adjustable bounding line C a fixed partition 70 (see Fig. 4). The sweep is adjusted so that in the case of an object without a defect the reflection R1 always appears in the section of the oscilloscope to the right of the partition. A vertically movable shield 62 is again provided for establishing line A to block out the sweep and the horizontally movable shield 66 is again provided for blocking out the pulse indication P. In the section to the right of partition 70 however, instead of the horizontally movable shield 67 there is now provided a vertically movable shield 62' to establish a line E a short distance below the peak of the normal light spot R1. When a defect of the type heretofore described occurs, causing scattering and absorption, the peak of light spot R1 will drop to a lower level such as R3. Therefore by setting shield 62' so that bounding line E appears above the peak of R3, it will be seen that a light spot will always be present except when a defect of this type occurs, in which case the light will disappear. The situation to the right of partition 70 is therefore opposite to the situation to the left of the partition. To the left of the partition there will be no signal except when a light spot R2 appears. To the right of the partition there will be no signal except when the light spot R1 disappears. Two separate photo cells 46 and 46' (see Fig. 5) are therefore employed, cooperating with the portions of the screen to the left and to the right of partition 70, respectively. When a light spot R2 appears in the section to the left of partition 70 photo cell 46 is energized to energize relay 48 to attract armature 51 against the action of spring 52 to close contacts 49 and energize the signal and operating mechanism. When the light spot R1 disappears from the portion of the screen to the right of partition 70 photo cell 46' is deenergized to deenergize relay 48' to permit spring 52' to close contacts 49' and operate the signal and operating mechanisms.

Having described my invention, what I claim and desire to secure by Letters Patent is:

In an ultrasonic inspection device having means for transmitting ultrasonic pulses into an object to be inspected, means for receiving reflections of the pulses, and an oscilloscope for visually indicating the transmitted pulses and the reflections thereof, said oscilloscope having a single sweep, the improvement which is characterized by means for separating the oscilloscope screen into two viewing sections, the first section comprising the area from the beginning of the sweep and ending before the illumination due to the reflection from the back surface of the object, the second section comprising the area occupied by said illumination from the back surface, means for shielding all illuminations on the oscilloscope in said first section except the area in which defects are indicated, light responsive means coacting with the unshielded area in the first section of the oscilloscope, a shield for normally exposing a predetermined portion of the illumination from the back surface when there is no scattering and absorption due to an internal defect but which exposes no illumination when a predetermined amount of scattering and absorption is present due to an internal defect, and light responsive means coacting with the second section of the oscilloscope.

HARCOURT C. DRAKE.

REFERENCES CITED

The following references are of record in the file of this patent:

UNITED STATES PATENTS

| Number | Name | Date |
|---|---|---|
| 2,144,337 | Koch | Jan. 17, 1939 |
| 2,481,515 | Isbister | Sept. 13, 1949 |
| 2,507,854 | De Lano, Jr. | May 16, 1950 |